United States Patent

Kaczorowski

[19]

[11] Patent Number: 6,158,114
[45] Date of Patent: Dec. 12, 2000

[54] APPARATUS FOR ASSEMBLING OF ANGLE PLATES ON THE FLANGES OF VENTILATION DUCTS

[76] Inventor: Walter Kaczorowski, ul. Komorowska 10, PL-05-830 Nadarzyn, Poland

[21] Appl. No.: 09/101,201
[22] PCT Filed: Mar. 29, 1996
[86] PCT No.: PCT/PL96/00006
   § 371 Date: Jul. 2, 1998
   § 102(e) Date: Jul. 2, 1998
[87] PCT Pub. No.: WO97/25179
   PCT Pub. Date: Jul. 17, 1997

[30] Foreign Application Priority Data

Jan. 8, 1996 [PL] Poland ................... P 312175

[51] Int. Cl.⁷ .................................................. B23Q 7/10
[52] U.S. Cl. ................................................ 29/818; 29/243.5
[58] Field of Search ........................ 29/243.5, 809, 29/221, 818

[56] References Cited

U.S. PATENT DOCUMENTS

| | | | |
|---|---|---|---|
| 2,995,811 | 8/1961 | Erdmann | 29/809 |
| 3,412,895 | 11/1968 | Hilton | 29/809 X |
| 3,543,376 | 12/1970 | Lovell et al. | 29/809 |
| 4,178,672 | 12/1979 | Amico et al. | 29/809 X |
| 4,989,438 | 2/1991 | Simon | 29/243.5 |
| 5,283,944 | 2/1994 | Goodhue . | |
| 5,448,815 | 9/1995 | Kolesar . | |

*Primary Examiner*—S. Thomas Hughes
*Assistant Examiner*—Marc Jimenez
*Attorney, Agent, or Firm*—Hunton & Williams

[57] ABSTRACT

An apparatus for placement of angle plates in transverse ventilation duct flanges comprising a blocking device attached to a platen to block the ventilation duct on the platen, a feeding device to transport angle plates including a slider, said slider being stably joined to a piston-rod of a cylinder to move freely along a guide bar, a supply hopper to house the angle plates located above the feeding device, a fastening device to fasten angle plates in flanges of the ventilation ducts and a clamping device to clamp the flange edges on the angle plates. The feeding device comprises a movable double arm carrier located on a base plate. The guide bar is positioned in the lower part of the base plate and on the slider working plane. The base plate has a port shaped like an angle plate and an oblong hole. The slider has an oblong slot and a socket. A carrying pin is joined to the carrier extending through the oblong hole into the oblong slot, so that the carrier is shifted by the slider after each of slider movements, the slider working plane has a furrow whose width is smaller than the arms span of angle plates. A guide is secured to the front part of the base plate above the furrow, such that upon backward movement of the carrier, the lowest angle plate stacked in the supply hopper is caught by the arms of the carrier and transported to the port. The angle plate drops through the port onto the slider working plane and upon forward movement of the slider, the socket reaches the corner of the angle plate so as to move the angle plate on the slider working plane towards the ventilation duct, whereby the corner of the angle plate reaches the guide causing the rising of angle plate arms.

6 Claims, 4 Drawing Sheets

APPARATUS FOR ASSEMBLING OF ANGLE PLATES ON THE FLANGES OF VENTILATION DUCTS

BACKGROUND OF THE INVENTION

The subject of this invention is an apparatus for placement of angle plates in ventilation duct flanges.

The invention is known in the United States under the U.S. Pat. No. 5,283,944 as an apparatus for placement of angle plates in transverse duct flanges, comprising a base plate which supports the ventilation duct, a blocking device to block the duct into position, a feeding device to move the angle plate until it reaches the corner of blocked ventilation duct, a fastening device to mate the angle plate to the duct flange. The feeding device consists of a slider to feed the lowest angle plate from the supply hopper towards the ventilation duct. Angle plates fed from the supply hopper must be shaped in such a way as to move freely towards the ventilation duct.

SUMMARY OF THE INVENTION

The apparatus for placement of angle plates in ventilation duct flanges consists of: a blocking device to block the ventilation duct on a platen, a feeding device of angle plates including a slider, said slider being stably joined to a piston-rod of the cylinder to move to-and-fro along a guide bar, a supply hopper of angle plates located above said feeding device, a fastening device to fasten angle plates in flanges of said ventilation ducts and a clamping device to clamp the flange edges on said angle plate. The feeding device of angle plates comprises a movable double arm carrier located on the base plate. Carrier arms have oval holes with stops secured to said base plate. Oval holes of the carrier and the oblong hole in the base plate have oblong axes parallel to the direction of slider movement. Carrier arms end with shaped clamps, whereas internal parts of carrier arms have the same shape as the external part of said angle plate being a little larger than it. The supply hopper of angle plates has a shape of an angle bar with arms separated a little more than 90° and with edges outwardly bent out twice as seen from above. Angle plates stacked in the supply hopper are fastened on the carrier during the full placement cycle.

The guide bar is located in the lower part of the base plate and in the working plane as the slider. The base plate has a port shaped like an angle plate and also an oblong hole. The slider has an oblong slot and a socket. A pin which is fixed to the carrier extends through the oblong hole into the oblong slot in such a way that the carrier is shifted by the slider in the last stage of each movement. The working plane of the slider has a furrow whose span is slightly narrower than that of the angle plate. The guide is secured to the front of the base plate above the furrow and with the backward movement of the carrier, the lowest angle plate in the supply hopper is caught by carrier arms and pushed forward. As the angle plate moves forward, it drops through the port and onto the slider working plane. Forward movement of the slider pushes the socket to reach the corner of the angle plate and transports the angle plate towards the ventilation duct. The corner of the angle plate reaches the guide, causing the arms of the angle plate to rise.

This apparatus is universal. It may be used with differently shaped angle plates because the feed of angle plates from the hopper is achieved by an appropriately shaped carrier design. This apparatus offers accurate and solid attachment of angle plates in ventilation duct flanges.

BRIEF DESCRIPTION OF THE DRAWINGS

The subject of this invention is presented on drawings, where FIG. 1—side view, FIG. 2—top view, FIG. 3—top view of a carrier in extreme positions of the slider, FIG. 4—cross-section of a carrier in a slider front position.

DETAILED DESCRIPTION

Figure 1:
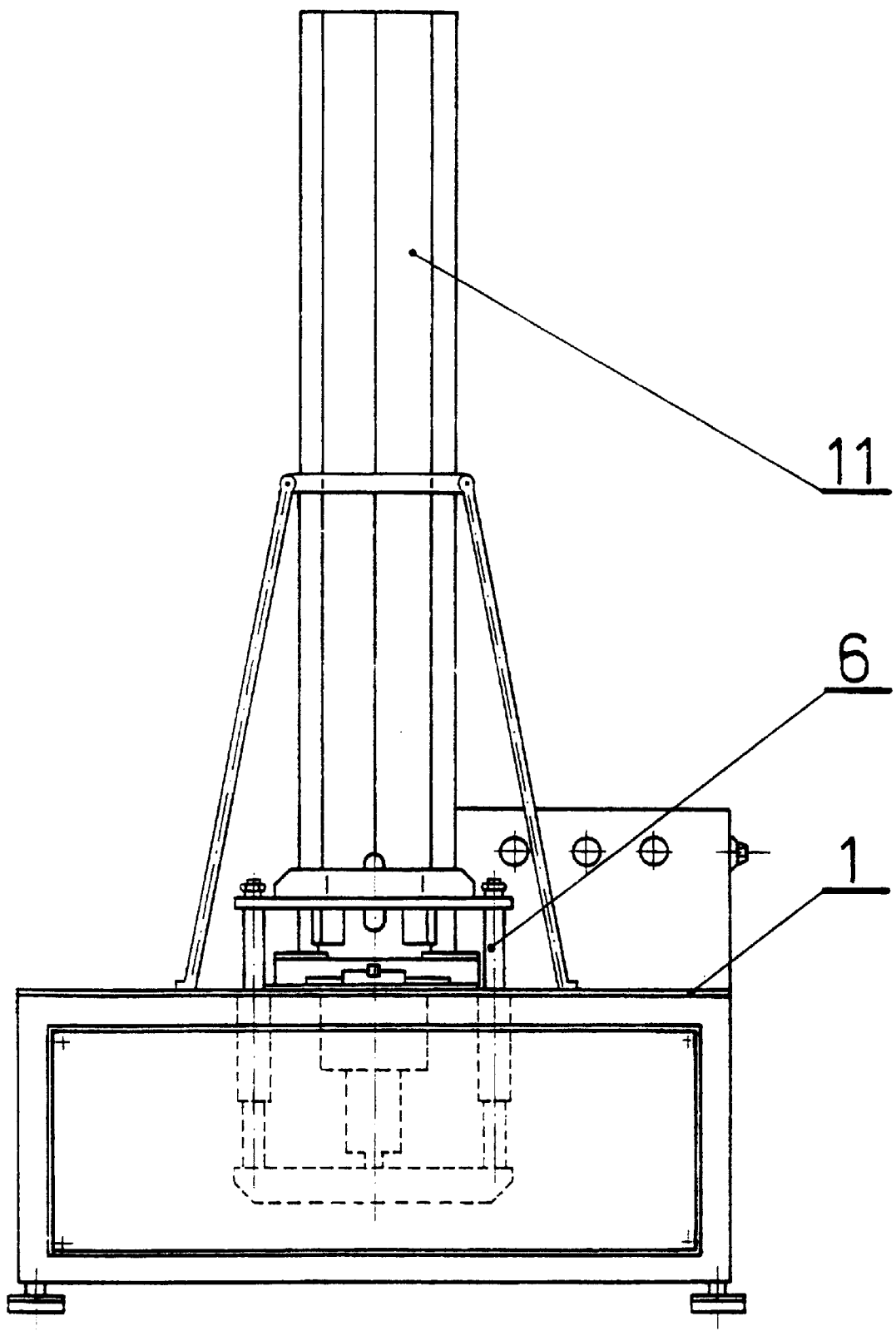
Figure 2:
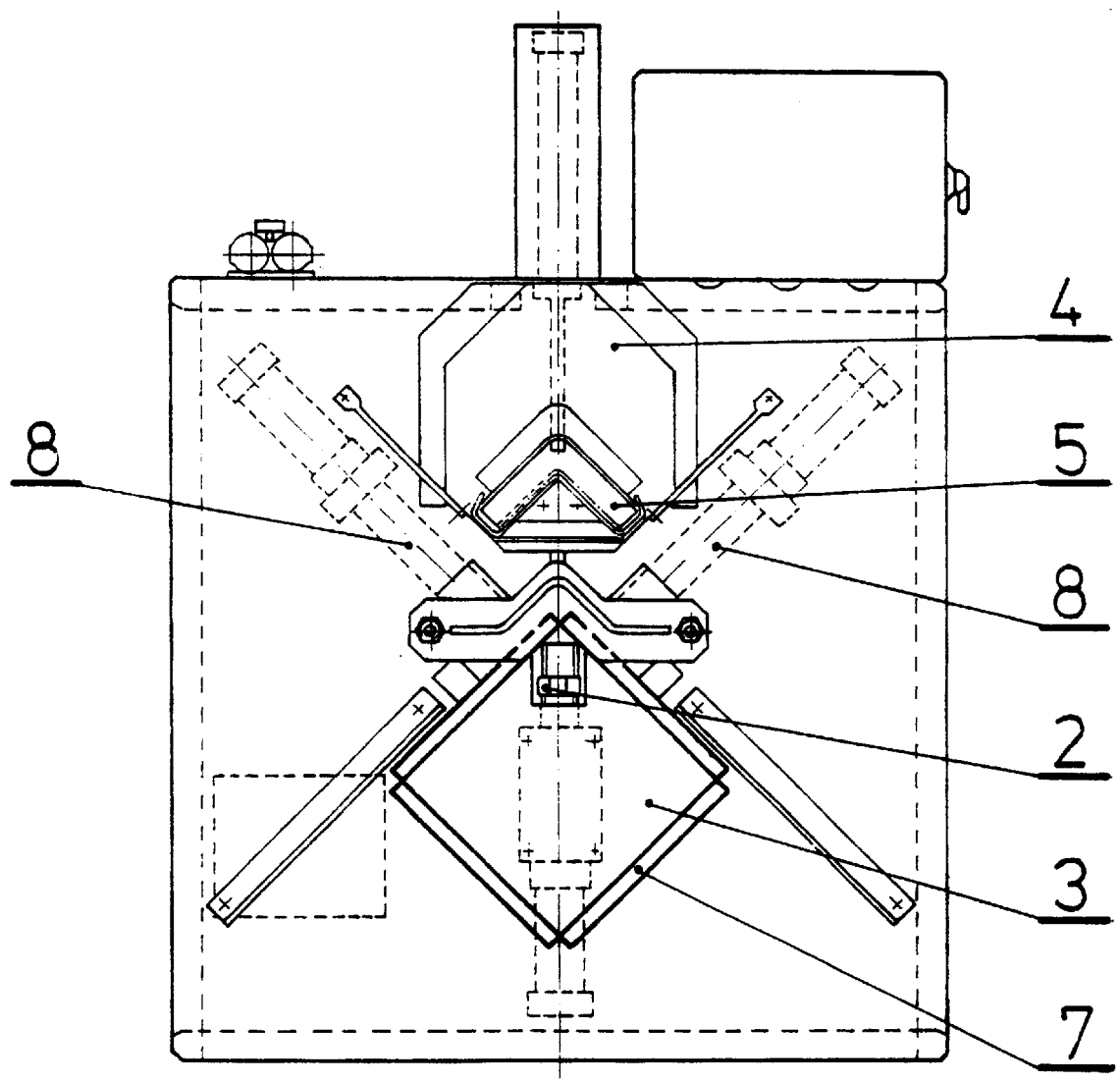
Figure 3:
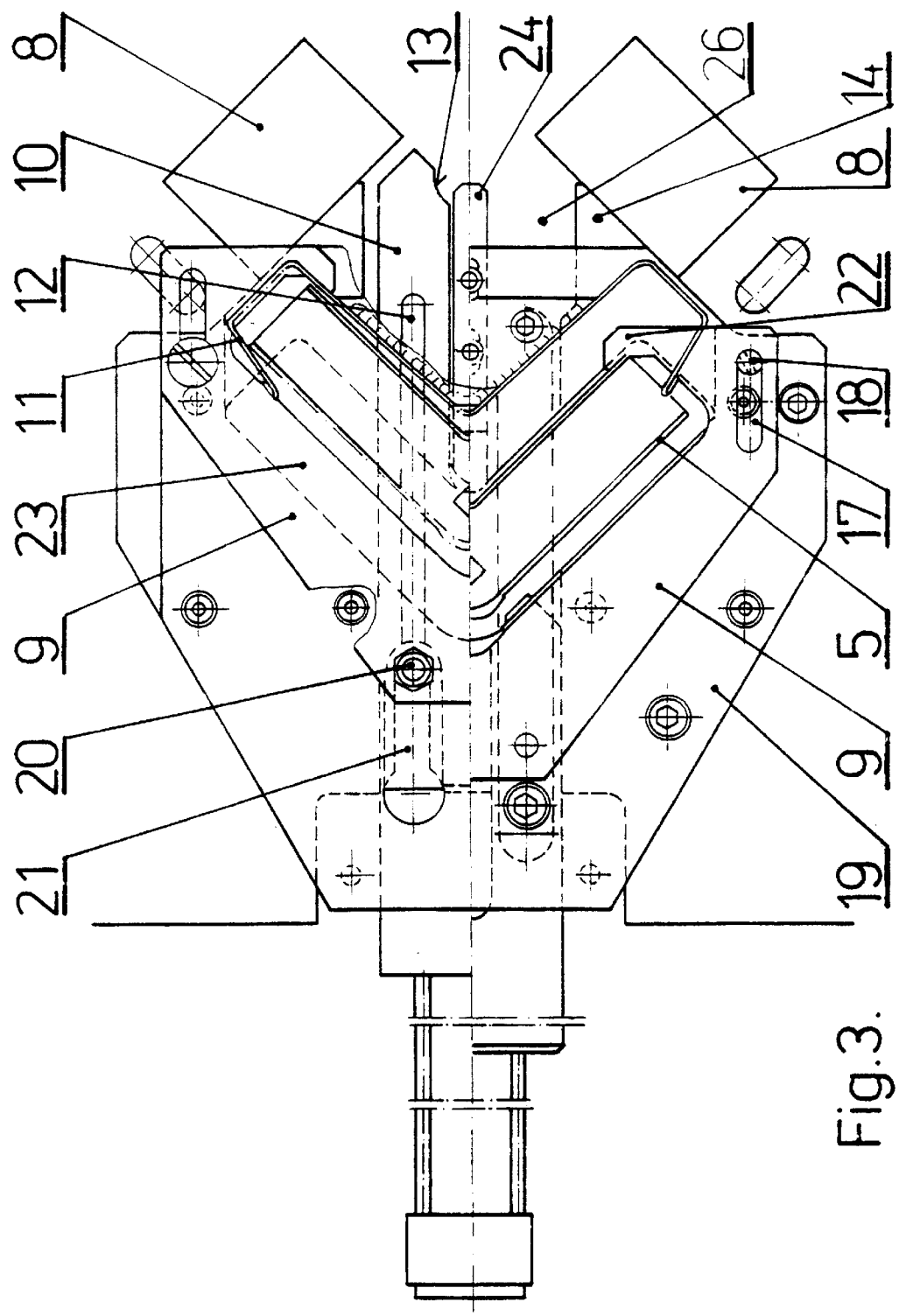
Figure 4:
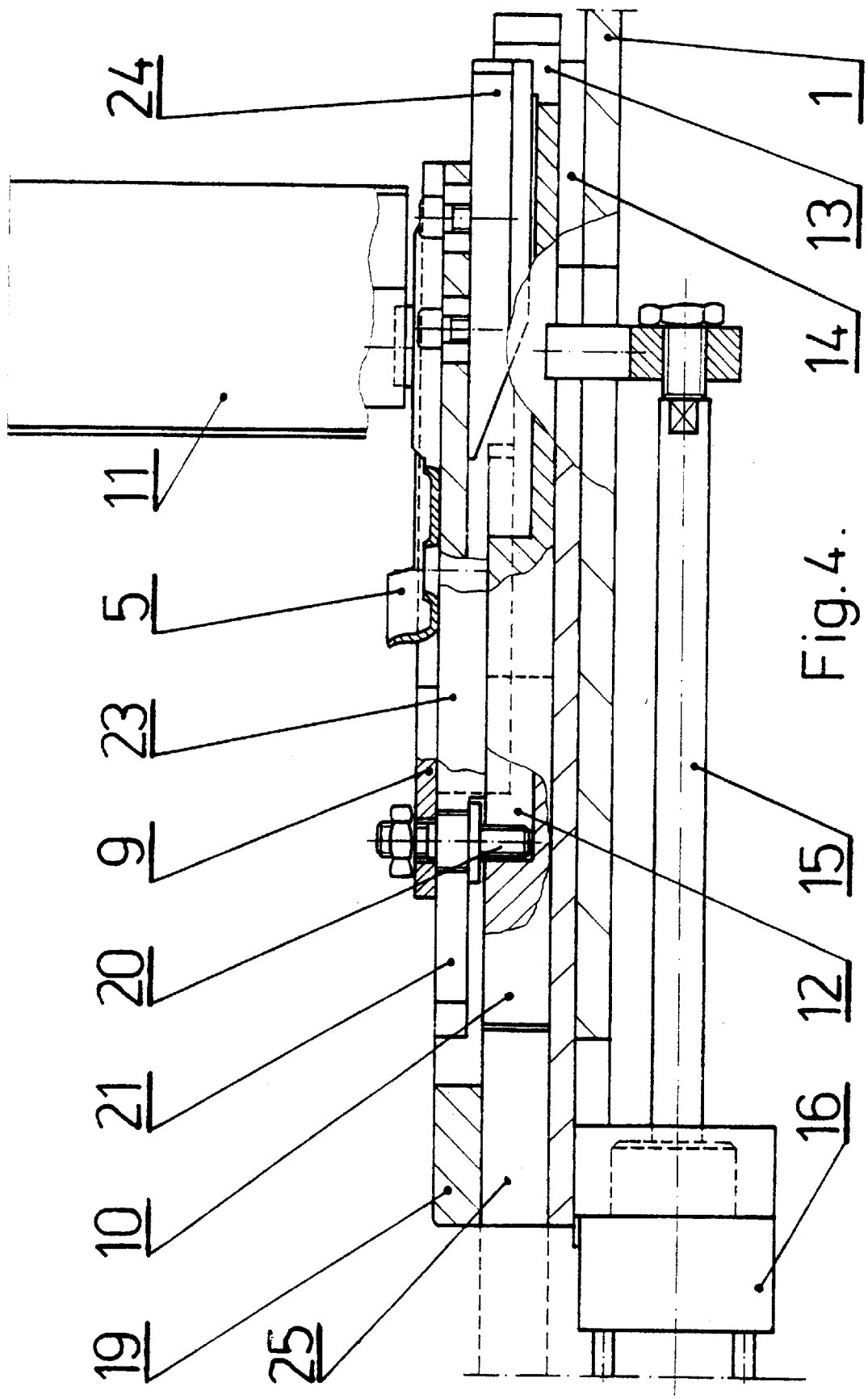

The apparatus comprises the blocking device 2 of the ventilation duct 3 installed on the platen 1, a feeding device 4 of the angle plate 5, a fastening device 6 to fasten the angle plate 5 in the ventilation duct 3 flange 7 and a clamping device 8 to clamp the ventilation duct 3 flange 7 on angle plate 5 edges. The feeding device 4 of the angle plate 5 comprises a double arm carrier 9 and a slider 10. There is a supply hopper 11 of angle plates 5 over the carrier 9. The slider 10 slides along the guide bar 25 located in the lower part of the base plate 19 and on the slider 10 working plane 14. The slider 10 is attached to the piston rod 15 of the cylinder 16. The carrier 9 is located on the base plate 19. The the slider 10 working plane 14 has a furrow 26. There is a port 23 and an oblong hole 21 on the base plate 19. In the front part of the base plate 19 the fixed guide 24 is located over the furrow 26 in the slider 10 working plane 14. Carrier 9 arms have oval holes 17 with stops 18 secured to the base plate 19. There is a carrying pin 20 fixed to the central part of the carrier 9. The carrying pin 20 is placed in an oblong hole 21 of the base plate and in an oblong slot 12 of the slider 10. The carrier 9 arms end with clamps 22.

The operation of the apparatus according to the invention starts by filling the supply hopper 11 with angle plates 5 and placing the ventilation duct 3 on the platen 1. When the apparatus is switched on, the blocking device 2 sets up the ventilation duct 3 in a proper position and blocks it for the entire time of the placement cycle. When a ventilation duct is blocked, the feeding device 4 is activated. The piston rod 15 of the cylinder 16 secured to the slider 10 starts moving backwards, in example away from the ventilation duct 3. When the front edge of the slider 10 slot 12 reaches the carrying pin 20 secured to the carrier 9, the slider 10 and the carrier 9 start moving backwards at the same moment. The clamps 22 of carrier 9 arms catch the lowest angle plate 5 stacked in the supply hopper 11 and move it towards the base plate 19 port 23. The angle plate 5 drops down through the port 23 to the working plane 14 of the slider 10 until its corner reaches the slider 10 socket 13. The piston rod 15 of the cylinder 16 changes its direction at the same time. The slider 10 moves the angle plate 5 on the working plane 14 towards the ventilation duct 3. The angle plate 5 is transported under the guide 24 which is installed in the lower part of the base plate 19 over the furrow 26 on the slider 10 working plane 14. The guide 24 presses the angle plate 5 corner causing its arms to rise. When the back edge of the slider 10 slot 12 reaches the carrying pin 20 of the carrier 9, the carrier 9 and the slider 10 commence to move forward. The carrier 9 advances under the angle plate 5 supply hopper 11 and at the same time the slider 10 places the angle plate 5 with the raised arms over the channel bar flanges 7 of ventilation ducts 3. The fastening device 6 is switched on and angle plate 5 arms are pressed into the channel bar flanges 7 of the ventilation duct 3. The final stage of angle plate 5 placement is to activate two clamping devices 8 which clamp the ventilation duct 3 flanges 7 on angle plate 5 edges.

What is claimed is:

1. An apparatus for placement of angle plates (5) including arms in transverse ventilation duct (3) flanges (7) said apparatus comprising:

a blocking device (2) attached to a platen, said blocking device to secure the ventilation duct (3) on the platen, a feeding device (4) including a slider (10), said feeding device to transport said angle plates, said slider (10) being stably joined to a piston-rod (15) of a cylinder (16) to move freely along a guide bar (25), a supply hopper (11) to house said angle plates (5) located above said feeding device (4), a fastening device (6) to fasten said angle plates (5) in said flanges (7) of said ventilation ducts (3) and a clamping device (8) to clamp the flange (7) edges on said angle plates (5), characterized by said feeding device (4) to move said angle plates (5) comprising a movable double arm carrier (9) located on a base plate (19), said guide bar (25) being located in a lower part of the base plate (19) and on a working plane (14) of the slider (10), said base plate (19) having a port (23) shaped substantially as one of said angle plates (5) and an oblong hole (21), said slider (10) having an oblong slot (12) and a socket (13), a carrying pin (20) being joined to said carrier (9) and extending through the oblong hole (21) into the oblong slot (12), so that the carrier (9) is shifted by said slider (10) after each movement of said slider (10), said slider (10) working plane (14) having a furrow (26) whose width is smaller than a span of said arms of said angle plates (5), a guide (24) being secured to a front part of said base plate (19) above the furrow (26), such that upon backward movement of said carrier (9), the lowest angle plate (5) stacked in the supply hopper (11) is caught by the arms of said carrier (9) and transported to said port (23), whereupon a respective angle plate (5) drops through the port (23) onto the slider (10) working plane (14), and upon forward movement of said slider (10), the socket (13) reaches the corner of the angle plate (5) so as to move the angle plate (5) on the slider (10) working plane (14) towards the ventilation duct (3), whereby the corner of the angle plate (5) reaches said guide (24) thereby causing the rising of said angle plate (5) arms.

2. An apparatus according to claim 1, characterised by said carrier (9) arms having oval holes (17) at ends thereof with stops (18) secured to said base plate (19).

3. An apparatus according to claim 2, characterised by said carrier (9) arms ending with shaped clamps (22), said clamps (22) having internal parts of said carrier (9) arms shaped like an external part of said angle plate (5).

4. An apparatus according to claim 2, characterised by said holes in said carrier (9) arms and said base plate (19) having oblong axes parallel to the direction of slider (10) movement.

5. An apparatus according to claim 1, characterised by said supply hopper (11) of the angle plates (5) having an angular shape with arms separated a little more than 90° and with edges bent out.

6. An apparatus according to claim 1, characterised by said angle plates (5) stacked in said supply hopper (11) being supported on said carrier (9) during a full cycle of said apparatus.

* * * * *